United States Patent
Ando et al.

(10) Patent No.: US 6,936,118 B2
(45) Date of Patent: Aug. 30, 2005

(54) PROCESS OF FORMING A COMPOSITE COATING ON A SUBSTRATE

(75) Inventors: Teiichi Ando, Belmont, MA (US); Charalabos Doumanidis, Vienna, VA (US)

(73) Assignees: Northeastern University, Boston, MA (US); Trustees of Tufts College, Medford, MA (US)

( * ) Notice: Subject to any disclaimer, the term of this patent is extended or adjusted under 35 U.S.C. 154(b) by 342 days.

(21) Appl. No.: 10/215,061

(22) Filed: Aug. 7, 2002

(65) Prior Publication Data

US 2003/0068518 A1 Apr. 10, 2003

Related U.S. Application Data

(60) Provisional application No. 60/310,714, filed on Aug. 7, 2001.

(51) Int. Cl.[7] .................................................. C23C 4/06
(52) U.S. Cl. ........................ 148/522; 148/523; 148/525; 427/576; 427/597
(58) Field of Search .................... 148/522, 523, 148/524, 525, 526

(56) References Cited

U.S. PATENT DOCUMENTS

| | | | | |
|---|---|---|---|---|
| 4,401,726 A | * | 8/1983 | Gnanamuthu | 428/610 |
| 4,732,778 A | * | 3/1988 | Kawasaki | 427/597 |
| 4,832,982 A | * | 5/1989 | Mori et al. | 427/597 |
| 4,837,417 A | * | 6/1989 | Funk | 219/76.15 |
| 5,552,575 A | | 9/1996 | Doumanidis | 219/124.34 |
| 5,736,199 A | | 4/1998 | Blucher | 427/430.1 |
| 6,035,925 A | | 3/2000 | Blucher | 164/419 |
| 6,146,476 A | * | 11/2000 | Boyer | 148/525 |

OTHER PUBLICATIONS

*Composite Coatings from Layered Precursors: Material Structure Modeling and Thermal Control*, Rajesh Ranganathan et al., NSF Grantees Conference, Jan. 7–10, 2001.

*In–Situ Processing of Nickel Aluminide Coatings on Steel Substrates*, Rajesh Ranganathan et al., Elevated Temperature Coatings: Science and Technology IV: Session 2: Interdiffusion of Coatings, ed. Narendra B. Dahotre et al., Proc. TMS Annual Meeting, New Orleans LA, Feb. 2001, pp. 171–180.

*Metal–Matrix Composite Coating by Layered Precursor Welding Implementation and Control*, Olga Vayena, M.S. Thesis for Tufts University, Sep. 2000.

* cited by examiner

*Primary Examiner*—George Wyszomierski
(74) *Attorney, Agent, or Firm*—Weingarten, Schurgin, Gagnebin & Lebovici LLP

(57) ABSTRACT

Precursor-based methods for the production of metal-matrix composite (MMC) coatings on steel and aluminum substrates for improved wear, corrosion and oxidation resistance have been made. Wire and surface precursors are deposited on the substrate by controlled thermal processing using plasma-arc, laser and high-density infrared radiation. The temperature distribution during the formation for coating is controlled by a real tine adaptive control method. The wire precursors produced by continuous pressure infiltration of SiC or mullite fiber with aluminum were used. Steel substrates double-layer plated with binary metals including nickel and aluminum are also thermal-processed to in-situ produce compound such as nickel aluminide coatings.

9 Claims, 9 Drawing Sheets

PROCESS OF FORMING A COMPOSITE COATING ON A SUBSTRATE

CROSS REFERENCE TO RELATED APPLICATIONS

Applicant claims priority under 35 U.S.C. §119(e) of U.S. Provisional Application Ser. No. 60/310,714 filed Aug. 7, 2001, entitled "Composite Coatings by Welding of Layered Precursors," the disclosure of which is incorporated by reference herein.

STATEMENT REGARDING FEDERALLY SPONSORED RESEARCH OR DEVELOPMENT

The research leading to this invention was supported by a grant from the National Science Foundation; therefore, the government may have certain rights with respect to this invention.

BACKGROUND OF THE INVENTION

The advantages of surface protection by coating range from longer product life, to improved product reliability, optimal manufacturing cost, opportunities for flexible design and increased recyclability. Applying effective coatings can thus have a wide range of economic impacts in almost all ranges of manufacturing. Coating materials vary from monolithic metals, alloys or ceramics to composites and various combinations of different materials in functionally graded layered structures. Existing coating technologies are classified largely into methods based on chemical and electrophoretic plating, chemical vapor deposition (CVD), physical vapor deposition (PVD), thermal spraying, cladding, dipping, and precursor fusing.

In any of the above techniques, maximum surface protection is achieved by tailoring the coating structure to the highest degree. To this end, the ability to produce coatings with novel microstructures is becoming a major issue in the development of coating technologies. An important category of coating with such novel microstructures is those of intermetallic compounds.

Metal-matrix composites (MMCs) are now used in many areas of manufacturing where combining different properties into one material is critically required. Most current structural applications in the aerospace, automotive and consumer goods industries use MMCs in bulk form. The use of full-volume MMCs however, is not always an optimal choice, particularly in applications where surface properties are of primary importance, but is often practiced because of a lack of technology to apply MMCs to the part surface only.

Metal Matrix Composite coatings on metal substrates impart superior mechanical properties in fatigue and hardness, resistance to abrasion, wear, oxidation, corrosion and high temperatures to the coated part, while the substrate achieves greater strength, stiffness and toughness with respect to the metal matrix. At the same time, coatings provide a more practical and economical option to solid metal-matrix composite products. Such coatings find extensive applications in combustion engine cylinder and piston liners, valves and their seats, jet engine components, electrical contacts, bearing rolls, cams, gears, cutting tool and machine tool surfaces, tank pipes, valves, nozzles, metal working dies, etc.

There are a number of techniques in use for production of MMC coatings, each having its advantages but also its limitations, as they are primarily intended for deposition of conventional materials. Cladding by rolling, extrusion, drawing and explosive techniques, as well as electroplating methods, provide non-fused, structurally discontinuous bonding of the coating to the base metal with relatively low strength. High velocity oxyfuel gas is a combustion spray process used widely for composite coatings, in which semi-molten particles are sprayed at high velocity. Also plasma spray thermal process is a popular current techniques for the production of thin coatings. However, sprayed coatings can be plagued by porosity due to air or oxide entrapment and bond strength sensitivity to the local phase distribution, as well as adhesion problems due to melting and mixing with the base metal.

BRIEF SUMMARY OF THE INVENTION

The present invention relates generally to coatings and methods used for coating substrate surfaces and, more specifically, to methods used for fabrication of composite coatings by welding of precursors.

The main objective in using precursor materials for the production of metal-matrix composite coatings on substrates is to provide basic structural materials with superior wear, corrosion and oxidation resistance at low cost. The methods use a substrate having at least one surface to be coated, a material source containing the precursor material and a heat source to cause a welding action that produces the coating. The choices of substrate and coating material are based on their properties, low cost and the application in industry.

One exemplary process to coat a substrate employs a reinforcing phase-containing wire precursor as the material source. This precursor wire can be fabricated from matrix metal foils and reinforcing phase powder or fibers. For example, the matrix metal foils may form a sandwich with the reinforcing material between the foils. The sandwiched foils can be subsequently rolled, folded or twisted into a cigar-like roll and then drawn into the final wire diameter. Alternatively, a continuous pressure infiltration technique may be used to fabricate wire precursors containing long fibers. During the coating process, the substrate surface is partially melted and the precursor wire is fed as filler cold wire right under the welding source. Molten droplets of precursor are transferred to the weld pool on the substrate, mixing and bonding with it during solidification. If a long-fiber containing precursor is used as the welding wire, the fiber disintegrates into particles, producing a particulate-reinforced MMC structure in the bead.

Another exemplary process uses a layered sheet precursor, with a specially designed sandwiched structure. This precursor consists of metal sheets (e.g. aluminum) with intermediate reinforcement-phase layers (such as alumina or silicon carbide) in powder or fiber form. The particulates are attached between the metal foils adhesively with organic binder or bonded ultrasonically by a seam welder, as the layered components are co-extruded, drawn or rolled together. This sheet precursor can be used like the wire in the process above when the heat source has a broader profile to engage the sheet precursor. In the second process, before the coating begins, the sheet precursor is tightly fixed or blasted conformally to the substrate surface. Subsequently, a welding heat source sweeps the area to be coated and the precursor melts locally, resulting in reactive or inert mixing of the matrix and particulate materials, adhesion to the substrate and creation of a coating layer. A portion of the substrate near the precursor sheet may also be caused to melt adding to the creation of the coating layer.

A third exemplary process comprises a material source, such as nickel and aluminum metallic layers, that is plated to the substrate surface with or without co-deposited ceramic particles. The plating is followed by in-situ partial melting of the precursor by a heat source in order to facilitate mixing and reactions of the constituents and formation of useful intermetallic compounds such as nickel aluminides in the resultant coating. Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Figure 1A:
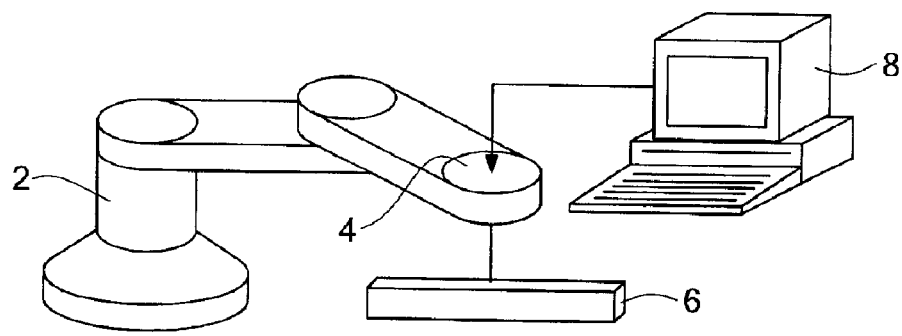
FIG. 1A is a block diagram of an open-loop processing system according to the invention.

The present invention relates to a process of fabricating composite coatings on substrates by welding of precursors. The process involves a series of steps, which may each be customized to affect the resultant product. The processes generally involve the preparation of one or multiple precursors, such as a layered sheet or a wire structure. The precursor is positioned relative to the substrate. A portion of the precursor, and possibly the substrate, are heated by a specific heat source to melt some of the metals. The metals are allowed to cool, which the melt that may have reacted while in the molten form. The whole target area of the substrate surface is sequentially scanned by the heat source, sequentially melting and resolidifying a local area. During the process, the power and positioning of the heat source is controlled to obtain the desired characteristics of the coating. Each part of the processes encompasses many choices, discussed further below, leading to the final qualities of the coating.

The precursor may be in wire, rod, stripe, sheet, web, foil, plate, or bulk (arbitrary geometry) form. The precursor is produced by joining multiple metal layers, with possible embedded reinforcing elements of metal, carbon or ceramic, into a form. The reinforcing elements may be shaped as particulates, powders, fibers, foils, and preformed network structures, etc. The joining of the multiple metal layers may be by welding, brazing, soldering, bonding, plating, spraying, mechanically attaching or other forms of joining. The formed precursor may be post processed by braiding, knitting, weaving, folding, twisting, forging, forming and other shaping or assembly processes into a final form. The final form for a precursor is selected to cooperate with the other parameters of the process.

The precursor may either be positioned stationary with respect to the substrate or be moved along with the heat source. When the precursor is stationary, it is usually attached to the substrate by a joining process such as welding, brazing, soldering, bonding, plating, mechanically attaching or other forms of joining. When the precursor is moved along with the heat source, it is simultaneously fed, either continuously or discretely, into the heated area under the heat source as it and the heat source move.

The heat source is used to melt certain precursor elements and possibly part of the substrate. The heat source can have many forms, such as a flame, an electric arc, a plasma arc, a laser beam, an electron beam, an ion beam, a high density infrared/visible/ultraviolet lamp, an X-ray or other radiation source, an electrical resistance, an electromagnetic inductance, mechanical friction and deformation, or any other possible source of heat as would be known in the art. Each heating source has characteristics of intensity, cost, ease of use, heat concentration and shape of heating spot that are considered in selecting the heating source for the process being utilized. The heating source melts certain precursor elements and may or may not melt part of the substrate surface as well. The melting causes either inert or reactive mixing of the fluidized components, as well as physical, chemical and material transformations such as: breakdown of precursor layers and reinforcing fibers; dissolution of network structures; chemical reactions and material phase changes.

Solidification accompanies physical, chemical and material transformations that generate the final material structure of the coating and, depending on the process used, possibly the substrate surface.

Scanning the heat source over the surface allows the heating and cooling steps to effect the changes over the entire area of the surface where the coating is to be developed. When the process uses one or more concentrated heat sources, including spot, line, torch or beam sources, this scanning sweeps the area to be coated in a sequential fashion. The sweep may be accomplished by moving the heat source(s) and/or the substrate relative to each other, in a coordinated way to cover the entire area to be coated. When the process uses one or more distributed heat sources; heating can be implemented in parallel over entire parts or the full area to be coated, without relative motion of the heat source(s) and the substrate. In addition, distributed heat sources allow the use of pre-shaped masks or contoured sheet precursors to define the substrate surface area to be coated.

Spot concentrated heat sources useful for this application include, but are not limited to, arcs, plasmas, and lasers. The spot sources must scan a narrow stripe on a meandering, spiraling or other planned trajectory to cover the coated area. A line concentrated heat source useful for this application is high-density infrared lamps that must scan a wider stripe in a straight, crooked or curved trajectory to cover the area. Torch-type concentrated heat sources useful for this application include flames, arcs, and plasmas. The torch heat sources must be moved to heat each area, but do not have to be positioned over each surface point. They can be moved mechanically, i.e. manually, or automatically by a custom hardware mechanism or a software programmable robot. Beam concentrated heat sources useful for this application include, but are not limited to, lasers, and electron beams. The beam heat sources can be raster-scanned across the surface by deflecting the beam optically, electrically etc. Types of distributed heat sources are diffuse radiation and inductive sources.

The types of materials that can be used in the described coating operation are broad. Substrates may be metallic, ceramic or composite. Usually the substrate has a higher melting point than the meltable portion of the precursor. The meltable component of the reinforced metal-matrix material can be aluminum, magnesium or other metals with similar properties. The reinforcing material has a higher melting point such as alumina, SiC and mullite. In plated layered structures, the material plated to the substrate has a higher melting point than the outer layer. Specifics of these layers are discussed below.

Figure 1B:
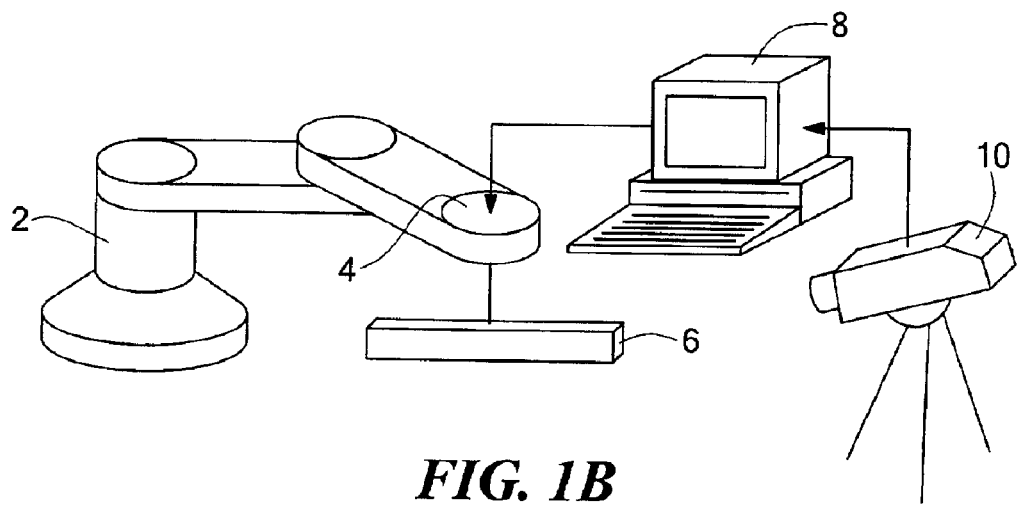
FIG. 1B is a block diagram of an closed-loop processing system according to the invention.

Control of the various inputs to produce the type of coating desired can be manual, but is usually managed by a computer as shown in FIGS. 1A and 1B. In open-loop mode, FIG. 1A, a robot 2 maneuvers a heat source 4 to trace a path on the surface of substrate 6 under control of a computer 8. The scheduling of the source power, distribution and motion is calculated beforehand. The heat source conditions including the heat intensity, power distribution and/or relative motion with respect to the substrate are part of this calculation. During operation of the system, the computer executes the control conditions as precalculated. In closed-loop mode, FIG. 1B, a model-based controller of the process is created to run execute computer 8. Feedback elements such as an infrared pyrometry camera 10 provide real-time input to the controller. The computer 8 still controls the robot 2 and heat source 4, but now uses the controller outputs to adjust operation of the system to produce coatings of higher quality.

Figure 2:
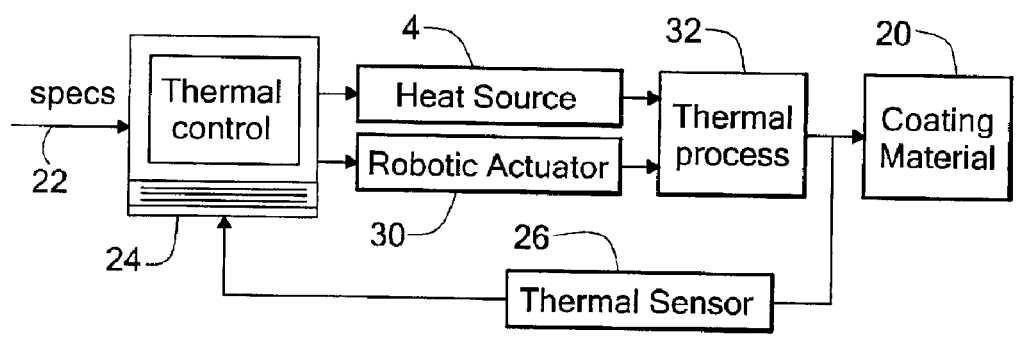
FIG. 2 is a diagram illustrating the components of the thermal closed-loop according to the invention.

FIG. 2 illustrates the interactions of a dynamic controller 24 with system for producing the coating 20. The controller 24 receives specifications 22 of the input materials— substrate and precursor, of the heat source 4 and robot 2, of the thermal sensor 26 and the required characteristics of the coating material 20. From these, the controller establishes starting conditions and action limits. The controller issues commands to the robotic actuator 30 and heat source 4. These commands start the thermal process 32, first heating the target and then starting the processing action. The controller monitors the thermal process 32 through the readings of the thermal sensor 26. When the thermal sensor readings indicate that action limits have been reached, the controller changes the operating conditions to maintain the process within the specifications.

The structures of the MMC coatings are directly related to the thermal field cycles, developed on the base surface during the thermal process. Therefore the thermal cycles on the material must be regulated in-process, to yield the desired microstructures. The output of the thermal sensors update the dynamic controller of the process itself, on which the controller design is based. For this purpose, an infinite-dimensional analytical process model and a finite-dimensional numerical simulation were developed and verified. A Linear Quadratic Regulator-based optimal actuator guidance strategy was also developed on the basis of the analytical models, in order to modulate the heat input distributions to meet the product requirements of the coating process.

Closed-loop regulation can account for local geometry changes (e.g., part thickness, adjacent edges and previous bends, meander turns, etc.), heat loss due to radiative, convective and conductive transfer, variations of the substrate and/or precursor material properties, and the heat source efficiency, etc. Rejection of such stray effects by closed-loop thermal control of the heat source power and motions during the process has produces more consistent coatings.

A secondary heat source may be added to the system exclusively for thermal control. The secondary source is synchronized with the primary heat source traveling at the same velocity along the same path while its transverse offset position and power is modulated in real time based on the infrared sensor feedback.

Figure 3A:
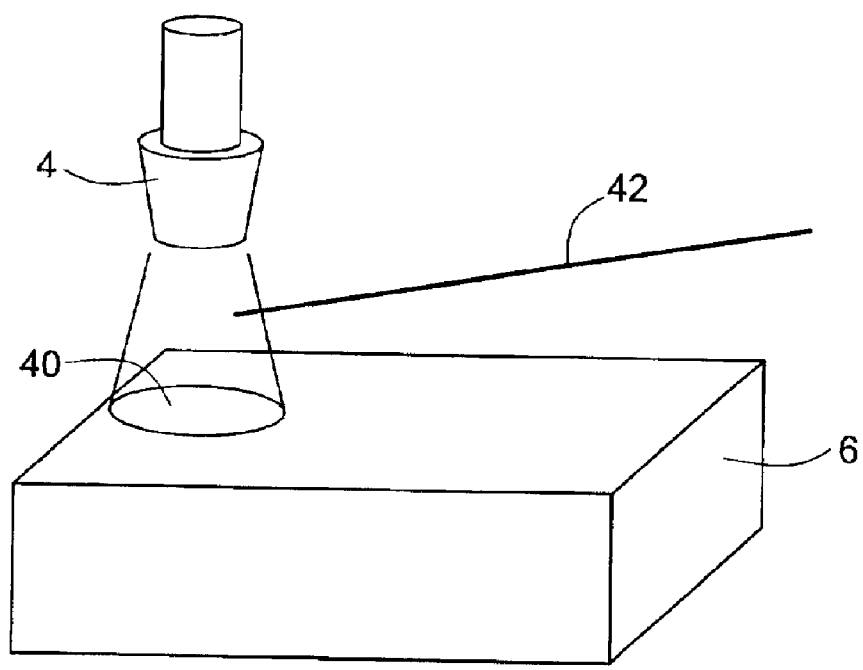
FIG. 3A is a simplified representation of a first embodiment of the process of the invention.

Ways to produce composite coatings by welding of layered precursors can be grouped into at least two types of processes. The first type of process is illustrated by FIG. 3A. A heat source 4 produces a heated region 40 on the surface of substrate 6. A fiber-reinforced metal-matrix composite precursor 42 is brought into the heated region 40 where some of it melts and mingles with the previously melted material in the heated region. The mixture cools and solidifies when the heat source translates to another location on the surface. The resultant coating on the substrate is a discrete-particle reinforced metal-matrix composite coating structure.

Figure 3B:
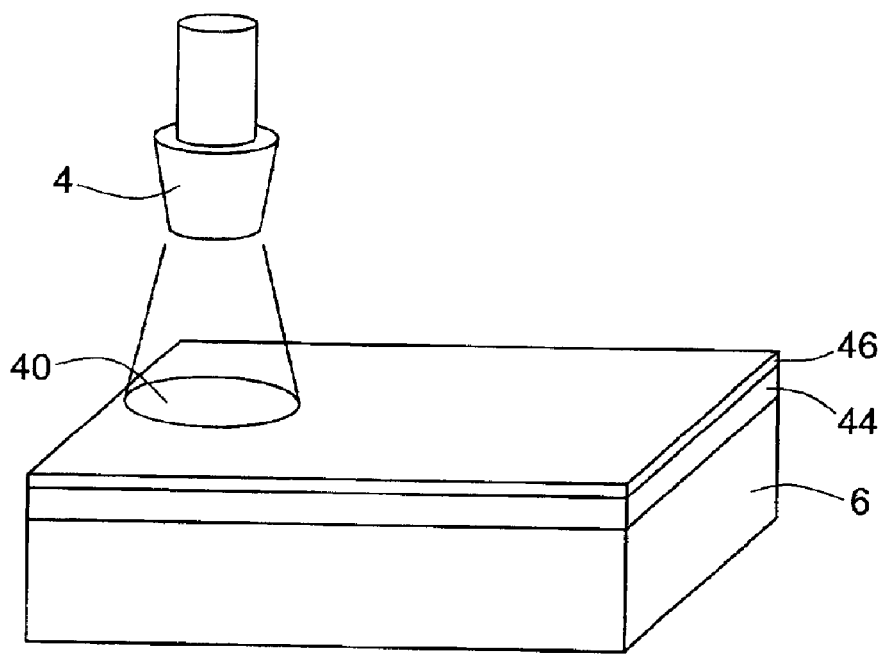
FIG. 3B is a simplified representation of a second embodiment of the process of the invention.

The second type of process is illustrated by FIG. 3b. Layers 44, 46 of precursor metallic material are placed on the surface of substrate 6. The heat source 4 produces a heated region 40 on the surface of structure. The heated region 40 melts the layers, and in some cases a portion of the substrate, causing the mixing and reaction of the precursors. The mixture cools and solidifies when the heat source translates to another location on the surface. The resultant coating on the substrate 6 is a metal-matrix composite coating structure. When the layers 44 and 46 are plated on the substrate 6, the heating rate and time can be adjusted to produce a desired intermetallic phase that nucleates and grows to a specific coating.

Figure 4A:
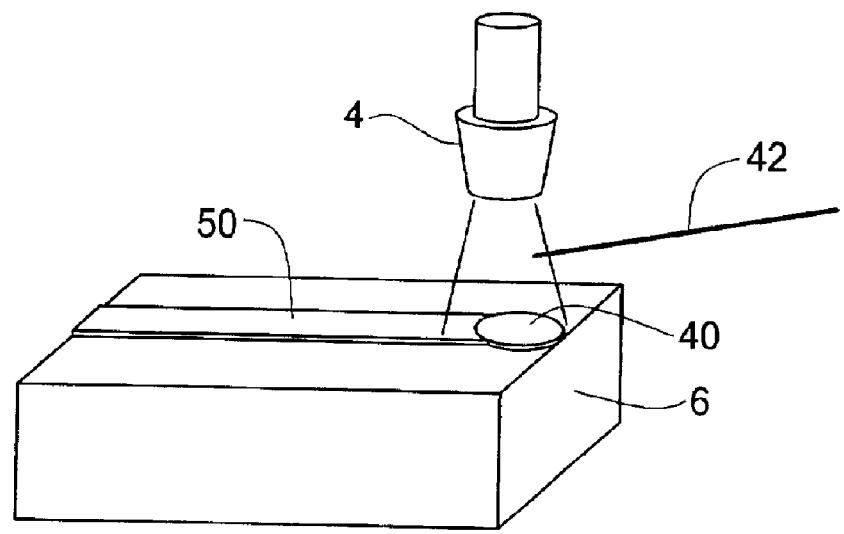
FIG. 4A is an illustration of a later stage of the process of FIG. 3A.

In looking at the particle reinforced metal-matrix composite coating method illustrated in FIG. 3A, the result of one pass of the heat source over the surface is shown in FIG. 4A. The heat source 4 is shown translated relative to FIG. 3A. The process has left a strip of coating 50 showing where the molten composite reinforced wire 42 and the melted substrate 6 have combined to form the coating.

Figure 5A:
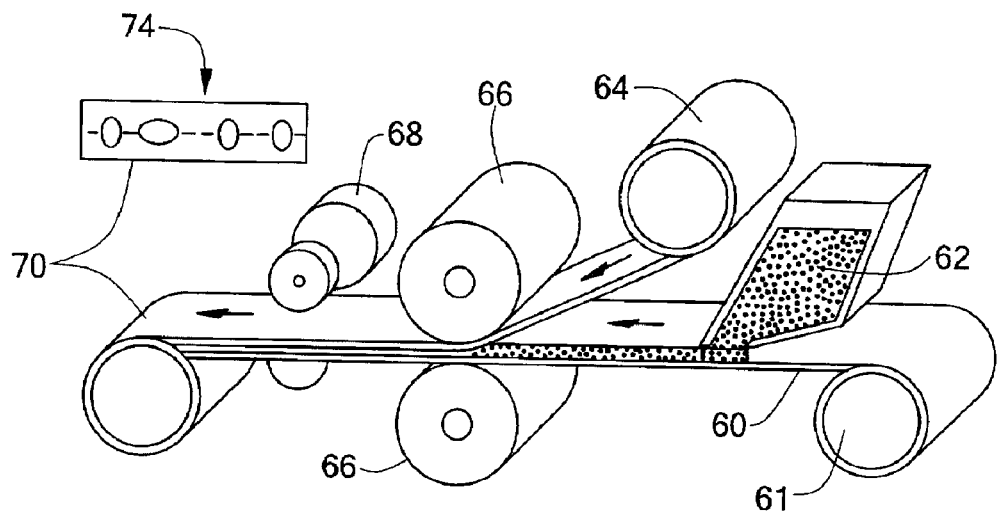
FIG. 5A is a diagram of a process to manufacture reinforced MMC precursor sheets used in process of FIG. 3A.

Traditionally, the particle reinforced metal-matrix material has been prepared as illustrated in FIG. 5A. A first sheet of metallic material 60 passes from a source reel 61 down a processing path. A particulate material 62 is spread on the first sheet 60, and a second sheet of metallic material 64 sandwiches in the particulate material 62. A bonding agent (not shown) may be spread on the first sheet 60 before the particulate material 62 is applied. Rollers 66 press the sandwich together before a welding apparatus 68 bonds the layers together securely. The resultant material 70 exhibits particles and metallic layers evenly distributed in a sheet structure 74.

Figure 5B:
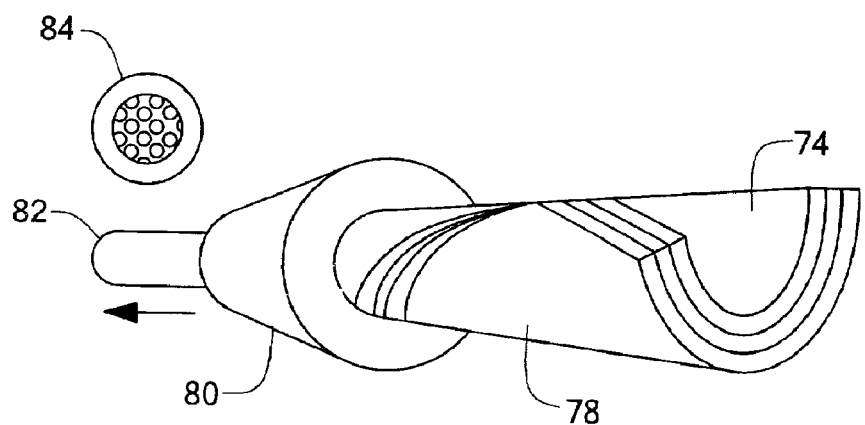
FIG. 5B is a diagram of a process to turn reinforced MMC precursor sheets into reinforced MMC precursor wire to be used in the process of FIG. 3A.

The sheet structure 74 is further processed to produce discrete-particle reinforced wire as shown in FIG. 5B. The sheet structure 74 is rolled into a solid tube 78, heated by a heater 80 and drawn from the heater as a wire 82. The wire 82 exhibits a structure as shown in cross section as 84 with the discrete particles elongated by the processing and surrounded by the metallic material. Recently, processes have become available to manufacture wire as long-fiber reinforced metal-matrix composite precursor by infiltration of fibers with the metal-matrix precursor material. Either of these wires may be used in the process described below.

The welding deposition of the MMC coating starts with uniform heating of the substrate, usually by scanning with the heating source guided by the welding robot, in several passes without feeding precursor wire. This preheating provides a standard thermal distribution at the nominal process conditions for successful deposition of the precursor material. After preheating, a melt pool is formed on the substrate and the feeding of the precursor as filler wire is started under the heating source. Molten droplets of the filler wire generated in the heating zone are transferred to the weld puddle on the substrate and bonded with it, producing a reinforcement bead upon solidification. Multiple adjacent or overlaid beads are continuously deposited by guiding the heating source along a meandering pattern controlled by the robot in order to produce the MMC coating over the desired substrate area.

Both a continuous feed of wire or a stepped feed procedure, in which the wire is periodically introduced and withdrawn from the heating zone can be used. The stepped feed is preferred because of the large difference between the melting points of the substrate and the precursor materials, leading to drastically dissimilar melting rates. When the wire is not fed, the heating source melts the substrate; as soon as a puddle is created, the composite wire is fed to locally deposit the molten reinforcement. The wire is then pulled back and fed again in similar repeated steps along the welded coating bead. In this embodiment, the precursor droplets with the particulate dispersion float over the puddle and solidification occurs sequentially and progressively in both the substrate and the coating materials. There is enough time for thermal conduction, components diffusion and a material transformation mechanism to proceed and produce the final microstructure. If the wire melts first, before the substrate is molten, the precursor droplets coagulate, as they cannot wet and bond with the substrate due to surface tension constraints. Precise thermal control of the substrate surface, in coordination with precursor wire feeding, must be exercised to obtain good adhesion of the coating with sufficient volume fraction of the particulates. When long-fiber reinforced metal-matrix composite wire precursor is used, the ceramic long fibers disintegrate into fine discrete particles allowing the particle and molten metal to mix with the substrate material.

Figure 4B:
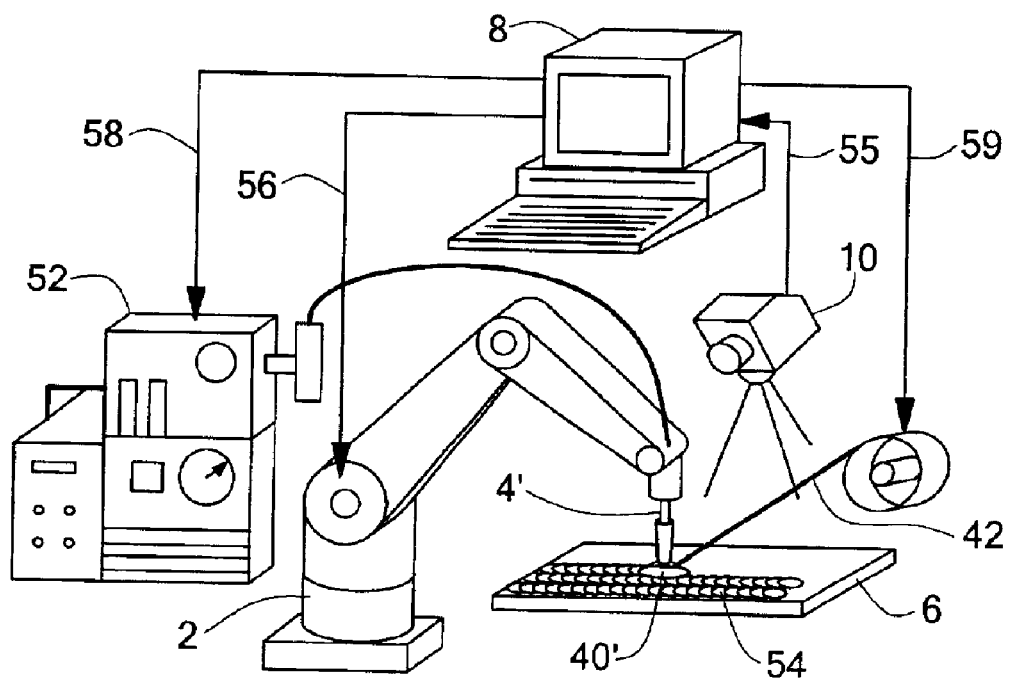
FIG. 4B is a closed-loop implementation of the process of FIG. 3A.

A system to implement this process with a closed-loop feedback is illustrated in FIG. 4B. The robot 2 receives x and y direction commands over link 56 from the computer 8. A heat source, in this case a plasma arc welding (PAW) head 4' is transported by the robot 2. The PAW creates a heating zone 40' focused on the surface of the substrate 6. Reinforced precursor wire 42 is fed into the heated zone 40' as directed by the computer of a communications link 59. A series of discrete-particle reinforced metal-matrix composite coating weld beads 54 indicate where the process has successfully coated the surface. A thermal sensor 10 monitors the heated zone 40' and transfers thermal information over a link 55 to the computer 8. The computer uses the thermal information to adjust the dwell time of the heat source and the intensity of the heat applied. Link 58 carries commands to the plasma arc unit 52.

Figure 6:
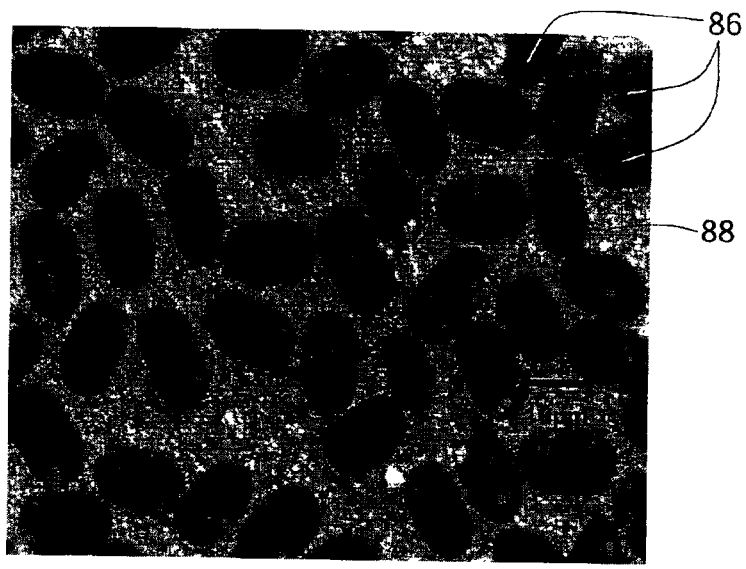
FIG. 6 is a cross section of a reinforced MMC precursor wire for use in the process of FIG. 3A.

An MMC Example:

In one embodiment, the substrates were 3 mm thick plates of low carbon steel, one of the most common structural materials for machined, formed or joined components and tools. Wire precursors prepared by continuous pressure infiltration were used. The precursor wire, 1.4 mm in diameter, contained in its cross section about 8000 continuous fibers of mullite, each 15 $\mu$m in diameter (3M Nextell 440 fiber), infiltrated with 1100 aluminum with a resulting volume fraction of fibers of about 60%. FIG. 6 illustrates the microstructure of the wire cross section showing the mullite fibers 86 interspersed in the aluminum 88.

Figure 7:
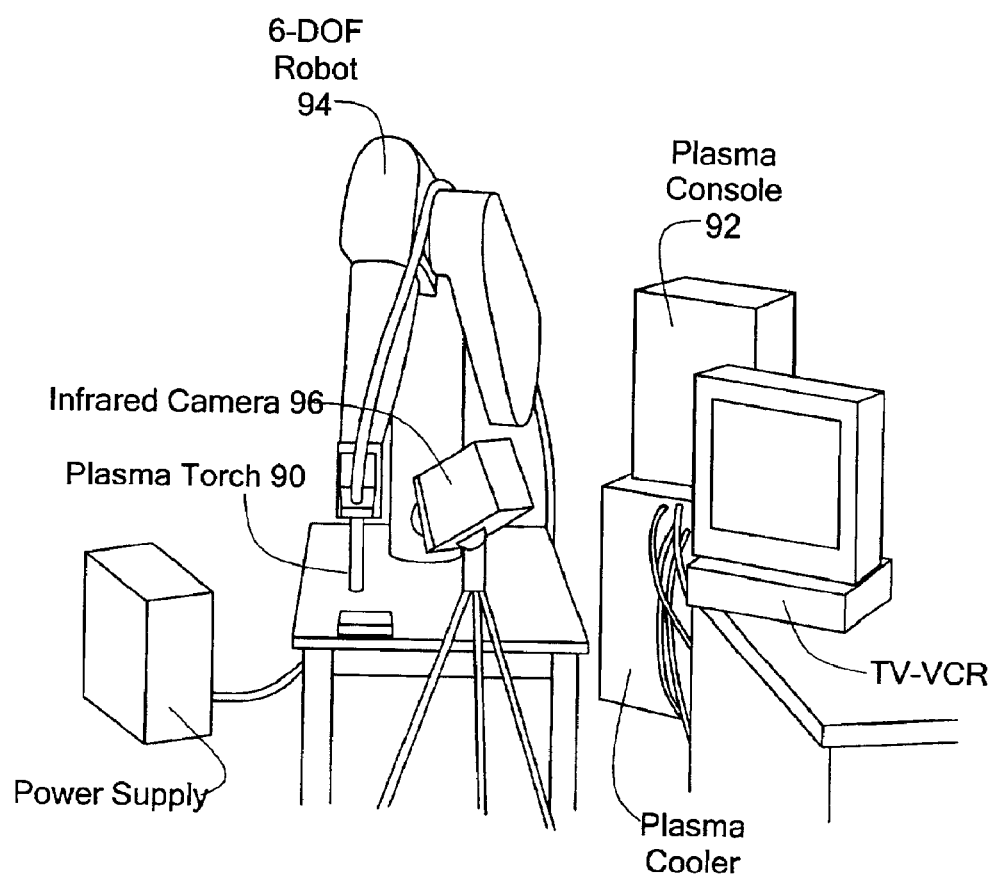
FIG. 7 is an illustration of the system used to implement an example of the process of FIG. 3A.

An apparatus to implement this embodiment is shown in FIG. 7 and includes a water-cooled plasma-arc torch 90 powered by a solid state DC-AC welding transformer through a plasma console 92 and operated in the transferred arc mode. Straight arc polarity was used, with a voltage of 20V and a current of 50A at the nominal conditions. Argon was employed as both the plasma and the inert shielding gas. The precursor wire was supplied to the plasma arc either manually or by a servo-driven roll feeder (not shown), at a feed rate of 2 mm/sec and an incidence angle of 45° with respect to the substrate surface. A 6-Degree of freedom (DOF) articulated robot arm 94 for arc welding, with a maximum transfer speed of 2 m/sec and positioning repeatability of 50 $\mu$m, was used to guide the plasma torch 90. The robot controller (not shown) has real time path control capabilities and can be programmed in a high level language via a standard terminal. The welding speed during the experiments was selected at 2 mm/sec. Operation of the PAW supply 92, the wire feeder and the robot system 94 was coordinated by a station computer (not shown) via digital-to-analog interface boards, under specially developed process control software.

In the feedback configuration, the computer also monitors the temperature field on the part surface using an infrared pyrometry camera with a high-bandwidth galvanometer mirror scanner and a liquid nitrogen cooled detector, sensitive in the wavelength range of 8–12 $\mu$m. By digitizing to 256 gray levels, an image averager of the infrared camera output provides temperature resolution of about 2° C. within the 1600–1800° C. range. The actual resolution achieved was about 0.4 mm on the part surface.

Figure 8:
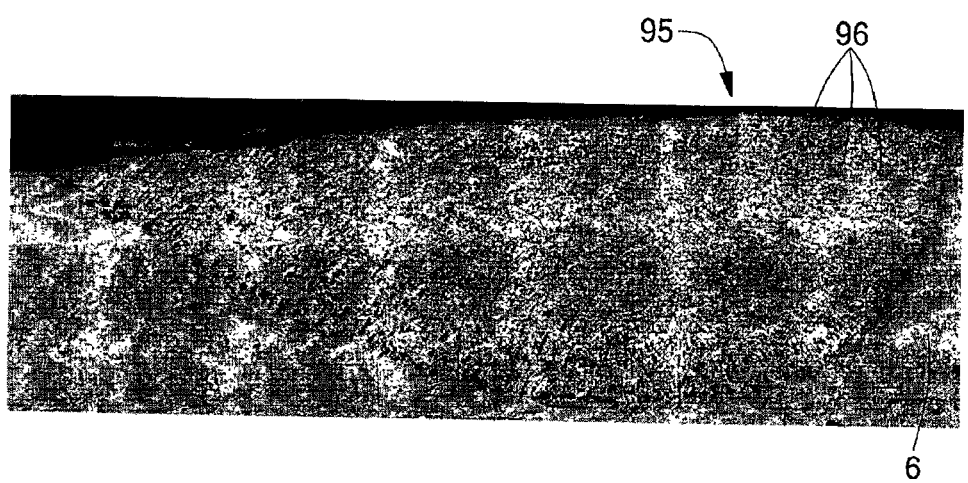
FIG. 8 is a micrograph of the weld produced by an embodiment of the process of FIG. 3A.

The aluminum in the precursor wire acts as the conductor for sustaining a stable arc between the work and the substrate and as the vehicle to bring the mullite fibers to the reaction. FIG. 8 shows the cross sectional microstructure of a bead obtained under these conditions. The deposited bead 95 has a length of 10 cm. The cross section shown is representative of other cross sections. The cross section exhibits a uniform distribution of fine discrete particles 96 that are mullite. These particles 96 have a diameter of about 10 $\mu$m or less which comparable to the cross sectional dimensions of the mullite fibers in the wire precursor. As the precursor wire was fed under the plasma source 90, the matrix metal becomes molten and the reinforcing long fibers are partially melted and dispersed as fine particles over the substrate pool melt, to yield the fine and uniform structure in the deposited bead upon solidification. An AC current through the PAW gives a better fiber breakup. The even distribution of the particles 96 in the bead 95 indicates that there were sufficient stirring actions during the deposition.

The volume fraction of particles 96 in the bead 95 was measured at 8%. The mixing of the steel substrate 6 and the precursor wire during the deposition decreased the volume fraction of fiber in the bead. Melt parameters can be adjusted to affect the volume fraction. The relative volumes of substrate and wire fused into the bead are approximately 92% and 8%, indicating some evaporation of aluminum.

The fine dispersion of the particles 96 in the bead 95 and the absence of defects in and around the bead indicate the improved mechanical properties of the MMC coating produced in this embodiment. The fully dense microstructures with good particulate volume fractions and excellent bonding to the substrate display superior mechanical properties. The knoop micro-hardness of the bead shown in FIG. 8 is 536, which is much higher than the knoop hardness of the steel substrate 6, which is only 140.

The above example used a fiber-reinforced metal-matrix composite wire precursor with a concentrated spot heat source in PAW unit. Other alternative combinations of form of precursor and heating sources are indicated in Table 1.

TABLE 1

|  | Spot source | Concentrated line source | distributed source |
|---|---|---|---|
| Reinforced MMC wire | yes | yes | no |
| Reinforced MMC sheet | yes | yes | yes |
| Reinforced MMC in bulk | yes | yes | no |
| Multiple Reinforced MMC wires | no | yes | yes |
| Reinforced mesh MMC sheets | no | yes | yes |

In looking at the coating method illustrated in FIG. 3B, the precursor lies stationary on the substrate surface before the substrate is heated. The heat source sweeps the designated area, melting the precursor and possibly some substrate in a local area. When the melted mixture solidifies, the composite coating forms.

The sheet material discussed previously in reference to FIG. 5A can be used in this method but it must be bonded to the substrate surface. The heat source must melt some of the substrate in order for the melted reinforced MMC precursor to adequately bond with the substrate. In this case, a concentrated heat source is usually used to sweep the area forming the coating.

Alternatively, this method can be implemented with two metals plated on the surface of the substrate. Maximum surface protection is achieved by tailoring the coating structure to the highest degree. The ability to produce a coating with a novel microstructure is a determinant in selecting the materials to be used. An important category of coatings with novel coating microstructures is that of the intermetallic compounds. An intermetallic coating can be produced on a substrate by causing a reaction between two metals in the substrate surface.

Potentially any binary metal system in which one of the elements has a relatively low melting point, e.g., 660° C. for aluminum, and the other has a significantly higher melting point, e.g., nickel 1453° C., and the two elements produce intermetallic phases with high melting points, such as NiAl in the Ni—Al system can be used in the method. The method requires that the element with the higher melting point be plated (not necessarily by electroplating) first on the substrate. The element with the lower melting point is then placed (by an appropriate method) on top of the layer of the higher melting point element. This method has been shown to work with Al—Ni. Other binary systems in the Al—X system could have X be for example: Ti, Y, Nb, V, Zr, Fe, Cr, Co, Cu, Th, etc. Similar combinations of elements can be found outside the Al—X system, such as Mg—Th, Mg—Y and many others.

Producing nickel aluminide coatings on steel substrates by controlled reactive thermal processing of plated precursors has applicability in many industries. The basic procedure comprises plating a steel substrate with nickel and aluminum, and controlled partial melting of these layers to cause in-situ formation of nickel aluminides in the resultant coating. The heat sources that are especially applicable to this method include: High-density infrared radiant heating (HDI), plasma arcs (PAW) and a Nd:YAG or CO2 laser. The nickel aluminide that is formed is dependent especially on the heat input into the process.

Producing a nickel aluminide coating on a steel substrate may be achieved by causing a reaction between aluminum and nickel on the substrate surface. Aluminum and nickel precursors may be powder mixtures, sheets or layers or combinations of powders and layers. The use of these precursors usually permits inclusion of another phase, such as oxide particles, in the resultant coating.

A bi-metal EXAMPLE:

In one embodiment of this method, coating precursors were prepared by pre-plating double layers of nickel and aluminum on 1.2 mm thick AISI 1010 steel sheet as shown in Table 2. The nickel layer, plated directly on the substrate, was 7 $\mu$m thick. The aluminum layer, plated on top of the nickel layer, was 10 $\mu$m thick.

The plated sheet was subjected to controlled surface heating by HDI to cause a nickel aluminide-forming reaction. The plasma-based infrared source used provides power densities up to 3.5 kW/cm$^2$ on the target surface with scan widths of up to 0.4 m. The target is placed in an environmentally controlled box (for instance with an Argon atmosphere) and heated by HDI through a quartz window. The use of HDI permits an inherently clean heating to temperatures in excess of 3000° C. with high heating rates up to a few hundred degrees per second and millisecond response to control.

The HDI processing of the plated precursor specimens was done by traversing the HDI lamp linearly over the surface at a constant speed. The five conditions shown in Table 2 were used to determine the effect of heat input on the coating microstructure. Specimens 1–3 were processed with a HDI lamp that produced a power density of 1.2 kW/cm$^2$ on the surface placed 25 mm below the lamp. For specimens 5 and 6, a lamp with the higher heating rating produced a power density of 2.0 kW/cm$^2$ on the surface placed 10 mm below the lamp. The traversing speed was adjusted to produce different relative heat input rates. The microstructures of the processed samples were characterized by Optical Microscopy SEM and X-ray diffraction (XRD).

The cylindrical geometry of the HDI lamp provides a uniform axial heat distribution. Thus, traversing the lamp over the surface permits a uniform heating of the surface. The HDI conditions shown in Table 2 produce a coating with uniform thickness but a different composition.

TABLE 2

| Spcmn | Plating thickness (μm) Al/Ni | Power density (kW/cm$^2$) | Lamp Speed (mm/sec) | Thickness of resultant layers (μm) Comp/Ni | Coating % Ni | Microstructure of composition | X-Ray results |
| --- | --- | --- | --- | --- | --- | --- | --- |
| 1 | 10/7 | 1.2 | 8 | 10/3 | 50 | Monolithic | Ni$_2$Al$_3$, Ni |
| 2 | 10/7 | 1.2 | 9 | 10/2 | 40 | Duplex | Ni$_2$Al$_3$, Ni, Al |
| 3 | 10/7 | 1.2 | 10 | 10/1 | 25 | Duplex | Ni$_2$Al$_3$, Ni, Al |
| 5 | 10/7 | 2.0 | 16 | 10/4 | 57 | monolithic | Ni$_2$Al$_3$, Ni |
| 6 | 10/7 | 2.0 | 17 | 10/3 | 50 | Duplex | Ni$_2$Al$_3$, Ni, Al |

Figure 9A:
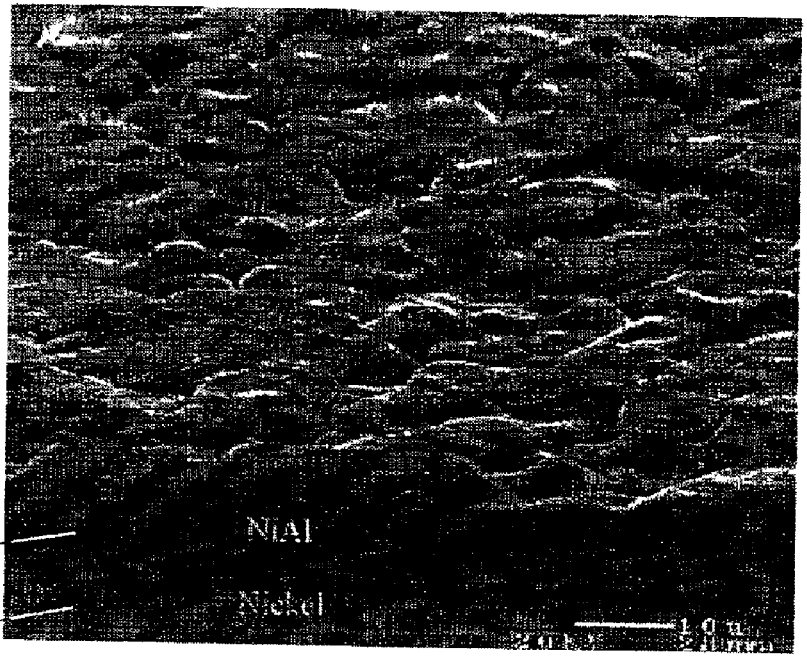
FIG. 9A is a cross-section micrograph of a coating produced by an embodiment of the process of FIG. 3B.
Figure 9B:
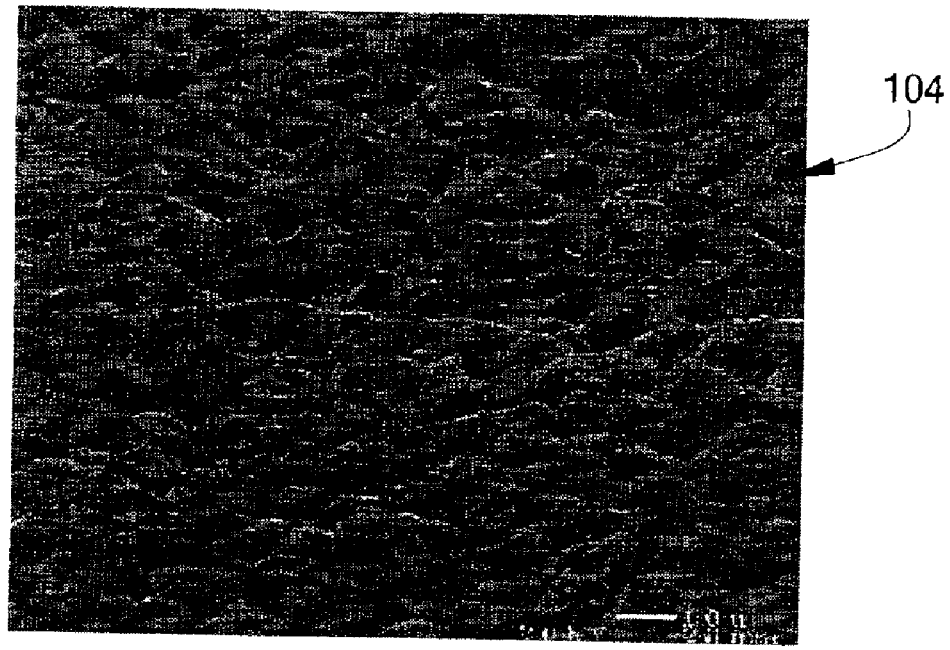
FIG. 9B is a surface micrograph of a coating produced by an embodiment of the process of FIG. 3B.
Figure 10A:
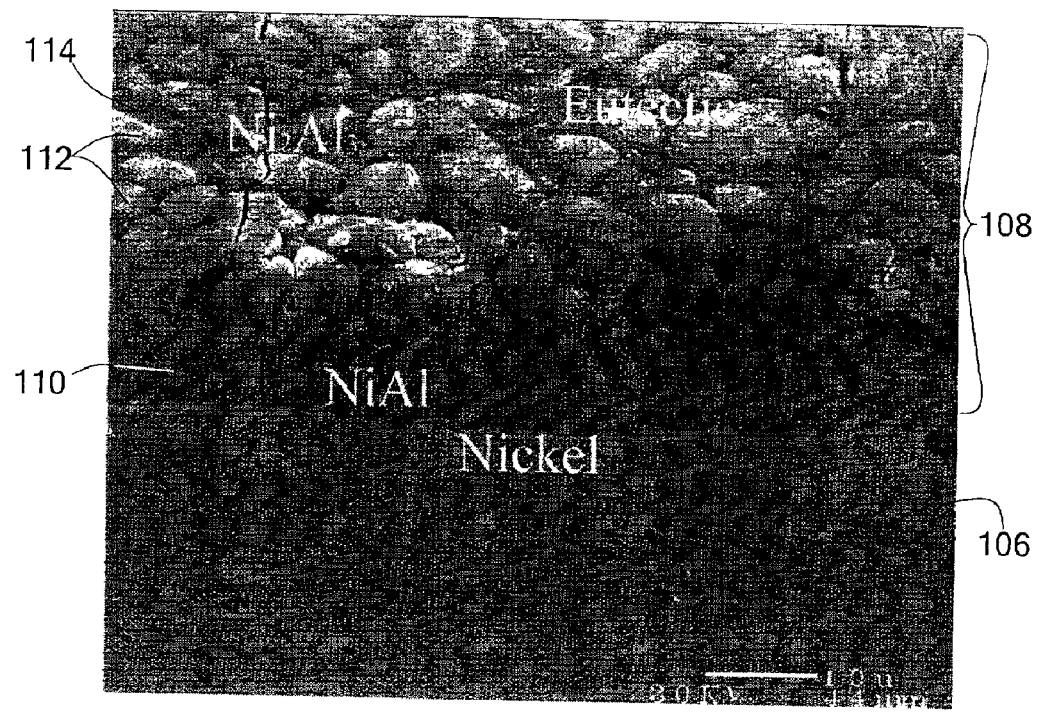
FIG. 10A is a cross-section micrograph of a coating produced by a second embodiment of the process of FIG. 3B.
Figure 10B:
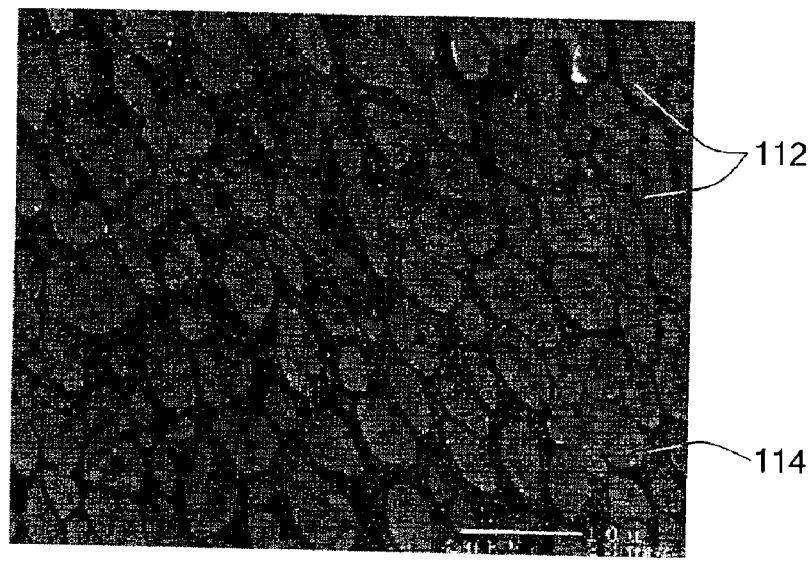
FIG. 10B is a surface micrograph of a coating produced by a second embodiment of the process of FIG. 3B.

FIGS. 9A, 9B, 10A and 10B show 3-D SEM micrographs of Specimens 1 and 2 showing a cross section and the top surface of each specimen. FIG. 9A shows that specimen 1 exhibits an unreacted nickel layer 100 and a monolithic reaction layer 102. FIG. 9B shows that specimen 1 has a smooth top surface 104. In FIG. 10A, specimen 2 also shows an unreacted nickel layer 106 under a reaction layer 108. The reaction layer 108 in Specimen 2 is monolithic 110 near the nickel layer 106 but shows granular grains 112 embedded in a matrix 114 in the top half reaction layer thickness. FIG. 10B shows the granular grains 112 present an uneven surface. Specimens 5 and 6 were processed with a higher power density HDI lamp and higher traverse speeds that provide similar levels of heat input to Specimens 1–3, but a shorter dwell time. As can be seen in Table 2, a slight increase in traverse speed changed the reaction layer microstructure from monolithic (Specimen 5) to non-monolithic (Specimen 6). In all specimens, part of the nickel layer remained unreacted. XRD analysis revealed that all coatings produced had Ni$_2$Al$_3$ as the intermetallic phase. The specimens having a non-monolithic reaction layer showed reflections of aluminum in addition to those of Ni$_2$Al$_3$. Aluminum reflections were virtually non-existent in the XRD pattern of the specimens with a monolithic reaction layer.

Referring to Table 2, the coating composition refers to the composition of the reaction layer in the coating and was calculated from the thickness of the aluminum and nickel layers melted and dissolved to liquid by HDI. The possible evaporation loss of aluminum was ignored in the calculation of coating composition. The reaction layers in Specimens 2, 3, and 6 have the reaction layers that are not monolithic, particularly toward the top surface of the reaction layers. The XRD results suggest that the duplex microstructures of the reaction layers consist mainly of the Ni$_2$Al$_3$ phase and aluminum.

Figure 11:
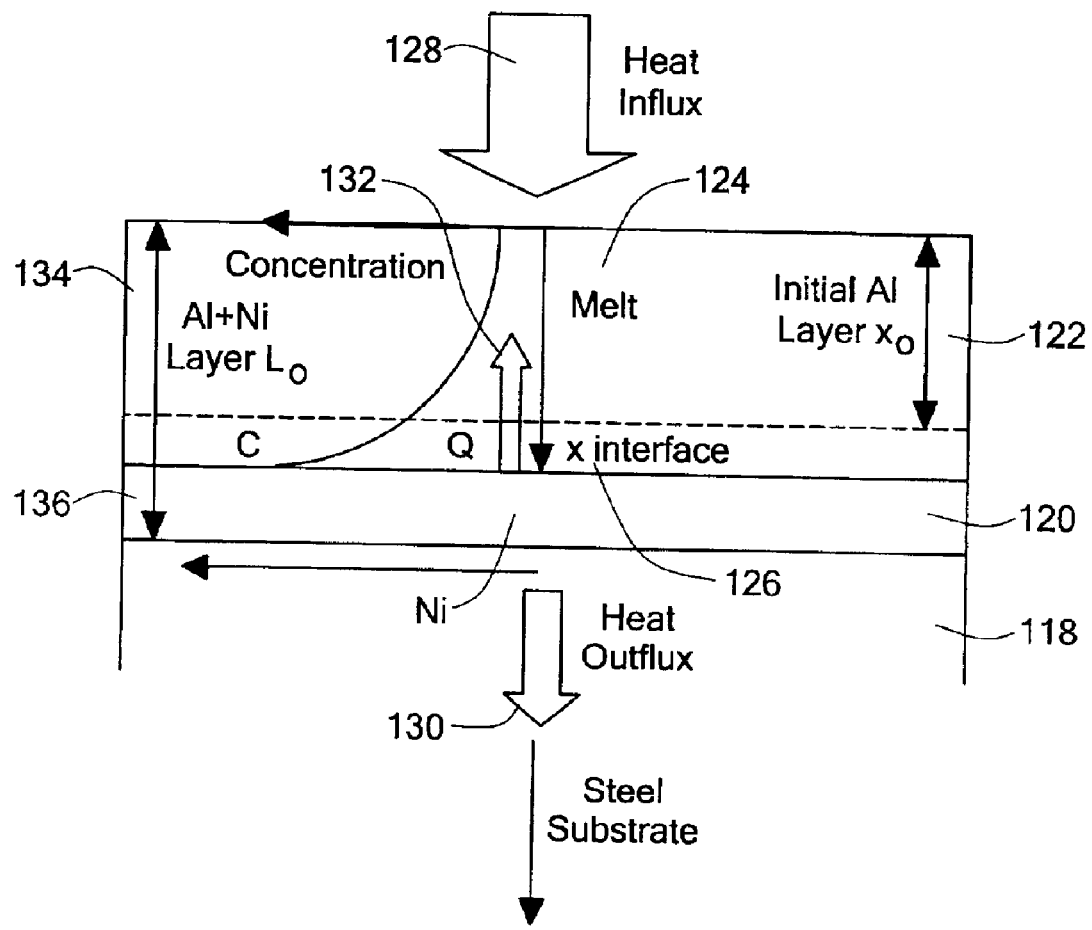
FIG. 11 is a diagram of heat flow for the process of FIG. 3B.

FIG. 11 illustrates the process that occurs in this embodiment of the coating production method. The right side of the drawing represents the plated structure, preheated, but not melted showing the steel substrate 118, the nickel layer 120 and the aluminum layer 122. In the center, the heat is sufficient to melt the aluminum 124 and some of the nickel 126. Heat is being input from the heat source 128 and being removed by the substrate, indicated by arrow 130. However, the reaction of the nickel and aluminum is inputting some heat, indicated by arrow 132. At the left of FIG. 11, away from the heat source 128, the aluminum and nickel are fully mixed 134 over a nickel layer 136 and ready to solidify.

The formation of different coating structures is explained by examining the reaction sequence that produces the intermetallic coatings:

1. Rapid heating, melting and partial evaporation of the aluminum layer;
2. Dissolution of nickel in the molten aluminum;
3. Nucleation of Ni$_2$Al$_3$ at the solid nickel/liquid-aluminum interface;
4. Rapid growth of Ni$_2$Al$_3$ grains and further heating due to reaction-heat generation;
5. Ni$_2$Al$_3$ formation ceases as the growing Ni$_2$Al$_3$ grains block nickel supply, or as the molten aluminum is exhausted whichever comes first; and
6. The remaining liquid, if it exists, solidifies to fill the space between the Ni$_2$Al$_3$ grains, producing a duplex microstructure. If there is no liquid left, monolithic reaction layer results.

The structure of the intermetallic coating is dependent on the external heat and whether it allows sufficient initial dissolution of nickel in the molten aluminum before the growth of Ni$_2$Al$_3$ stops leaving a nickel deficient liquid unconsumed. By varying the temperature of the external heat and the length of time it is applied, the structure of the intermetallic layer, including the type of Ni—Al compound produced, can be controlled.

Similar coatings to those discussed above were produced by plasma-arc heating, but the process with each source must be adjusted. When using a plasma-arc torch, care must be taken to produce a coating of a uniform thickness. Similarly a laser could produce the heat source, but the power must be regulated so that only the precursors are melted and not the substrate.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A method of producing a metal-matrix composite coating on a surface of a substrate comprising:
    a) melting a portion of said surface of said substrate with a heat source forming a melt pool;
    b) feeding a reinforced metal matrix precursor into a melt zone so that molten precursor drops enter said melt pool;
    c) allowing said molten precursor and melted substrate to mix, react and mix and react in said melt pool;
    d) solidifying said pool forming a compound that coats said portion of said surface of said substrate; and
    e) repeatedly redirecting said heat source to another portion of said surface and repeating steps a–d until a desired portion of the substrate surface is coated, and wherein said heat source comprises a distributed source and said precursor comprises a contoured sheet precursor, and said contoured sheet precursor comprises a mesh sheet.

2. The method of claim 1 wherein said heat source is redirected by a robot programmed to heat the desired portion of the surface.

3. The method of claim 1 wherein said heat source is redirected by raster-scanning a beam.

4. A method of producing a coating on a surface of a substrate comprising:

laying a precursor in a stationary manner on a surface of said substrate;

sweeping a path along said substrate surface with a heat source, locally melting the precursor at each successive location;

allowing reactive mixing, inert mixing and reactive and inert mixing of the melted precursor components; and forming an intermetallic compound on said surface of said substrate as said melted material solidifies, wherein said precursor comprises a plurality of metallic layers deposited on said substrate surface, the plurality of metallic layers plated or sprayed on said substrate surface, and further comprising ceramic particulates co-deposited with said plurality of metallic layers, wherein said ceramic particulates are alumina, silicon carbide or mullite.

5. The method of claim 4 wherein a portion of the substrate is melted during the sweeping step and said reactive mixing, inert mixing and reactive and inert mixing are allowed among the precursor components and said melted substrate.

6. The method of claim 4 wherein said precursor comprises a plurality of materials formed into a sheet.

7. The method of claim 6 wherein a said sheet comprises a mesh sheet.

8. The method of claim 4 wherein said precursor is fixed to said substrate surface by bonding, mechanically fixing or joining.

9. The method of claim 4 wherein said heat source comprises a concentrated line heat source.

* * * * *